US012423791B2

(12) United States Patent
Namiki et al.

(10) Patent No.: US 12,423,791 B2
(45) Date of Patent: Sep. 23, 2025

(54) IMAGE RECOGNITION APPARATUS, IMAGE RECOGNITION METHOD, AND RECORDING MEDIUM

(71) Applicant: NEC Corporation, Tokyo (JP)

(72) Inventors: Shigeaki Namiki, Tokyo (JP); Shoji Yachida, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 400 days.

(21) Appl. No.: 17/796,702

(22) PCT Filed: Feb. 18, 2020

(86) PCT No.: PCT/JP2020/006180
§ 371 (c)(1),
(2) Date: Aug. 1, 2022

(87) PCT Pub. No.: WO2021/166058
PCT Pub. Date: Aug. 26, 2021

(65) Prior Publication Data
US 2023/0053838 A1   Feb. 23, 2023

(51) Int. Cl.
*G06T 7/00* (2017.01)
(52) U.S. Cl.
CPC .. *G06T 7/0004* (2013.01); *G06T 2207/10016* (2013.01); *G06T 2207/20021* (2013.01); *G06T 2207/20084* (2013.01)
(58) Field of Classification Search
CPC ......... G06T 7/0004; G06T 2207/10016; G06T 2207/20021; G06T 2207/20084; G06T 7/11; G06T 7/194; G06T 2207/10152
See application file for complete search history.

(56) References Cited

U.S. PATENT DOCUMENTS

| | | | |
|---|---|---|---|
| 10,176,405 B1 | 1/2019 | Zhou et al. | |
| 2011/0026804 A1* | 2/2011 | Jahanbin | G06T 7/45 |
| | | | 382/141 |
| 2013/0128026 A1 | 5/2013 | Hirose | |
| 2018/0330193 A1* | 11/2018 | Ikeda | G06T 7/0004 |
| 2022/0351497 A1* | 11/2022 | Namiki | G06T 7/20 |

FOREIGN PATENT DOCUMENTS

| | | |
|---|---|---|
| JP | 2011-095171 A | 5/2011 |
| JP | 2018-190329 A | 11/2018 |
| JP | 2019-184489 A | 10/2019 |
| WO | 2019/243863 A1 | 12/2019 |

OTHER PUBLICATIONS

CN110390662A Kazunori, 2019, WIPO translated (Year: 2019).*
International Search Report for PCT Application No. PCT/JP2020/006180, mailed on May 12, 2020.

* cited by examiner

*Primary Examiner* — Jianxun Yang

(57) ABSTRACT

The image recognition apparatus includes an image selection unit and a recognition unit. The image selection unit selects a feature image representing a feature portion of an object from among captured images of a time series in which the object is photographed. For example, the feature image corresponds to an image showing an abnormal portion. The recognition unit performs a recognition process of the object using the feature image. By the recognition process, an abnormality of the object is detected.

11 Claims, 11 Drawing Sheets

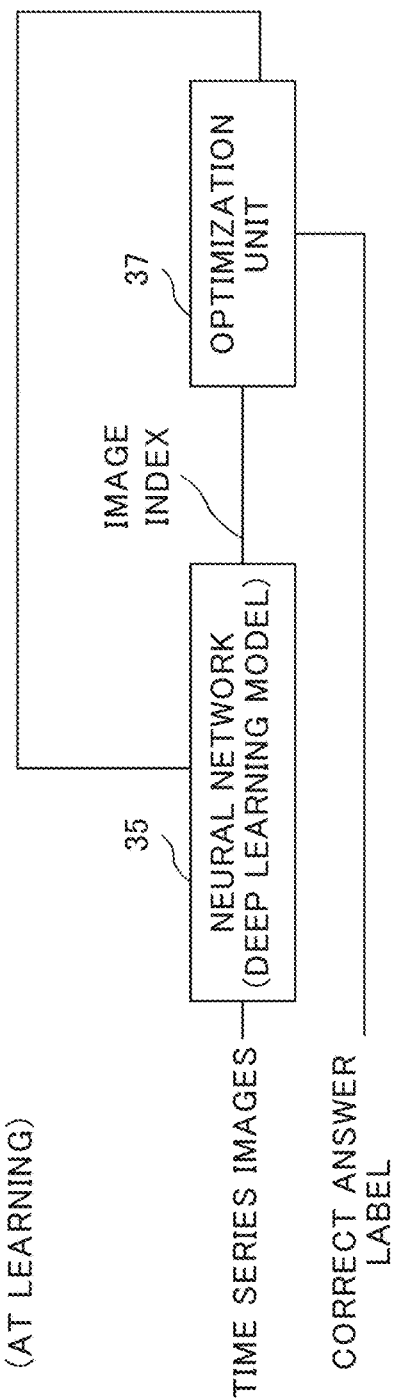
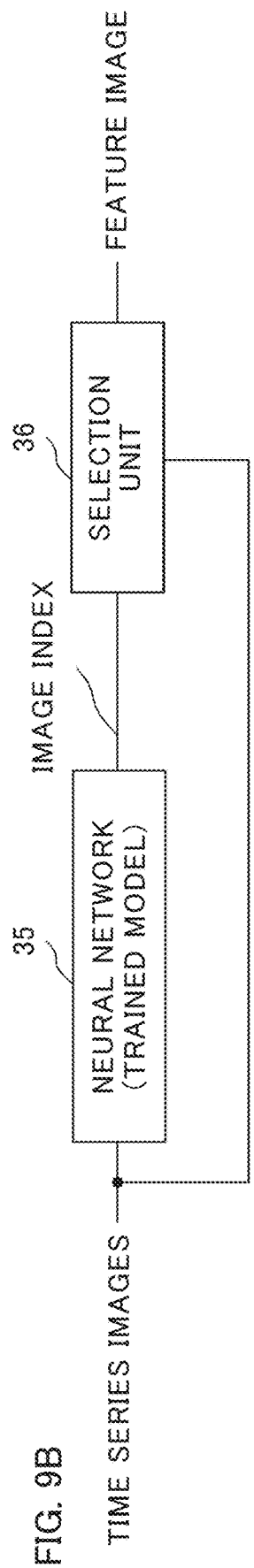

IMAGE RECOGNITION APPARATUS, IMAGE RECOGNITION METHOD, AND RECORDING MEDIUM

This application is a National Stage Entry of PCT/JP2020/006180 filed on Feb. 18, 2020, the contents of all of which are incorporated herein by reference, in their entirety.

TECHNICAL FIELD

The present disclosure relates to a technique for recognizing an abnormality of an object included in an image.

BACKGROUND ART

A technique which carries out an abnormality inspection using an image of a product has been proposed. For example, Patent Document 1 describes a system for inspecting a defect of a product by using images of a moving molded sheet taken continuously with a camera in time.

PRECEDING TECHNICAL REFERENCES

Patent Document

Patent Document 1: Japanese Laid-open Patent Publication No. 2011-95171

SUMMARY

Problem to be Solved by the Invention

A defect inspection system described in Patent Document 1 performs the same process with respect to all images obtained by a camera. Therefore, a process with the same load is performed even for an image that does not include a defect, and since a process time increases in a case where there are many images, it is not suitable for real time processing in a production line or the like.

It is one object of the present disclosure to provide an image recognition apparatus capable of improving efficiency of recognition at an abnormal location based on a captured image of an object.

Means for Solving the Problem

According to an example aspect of the present disclosure, there is provided an image recognition apparatus including:
an image selection unit configured to select a feature image representing a feature portion of an object from among captured images of a time series in which the object is photographed; and
a recognition unit configured to perform a recognition process of the object using the feature image.

According to another example aspect of the present disclosure, there is provided an image recognition method including:
selecting a feature image representing a feature portion of an object from among captured images of a time series in which the object is photographed; and
performing a recognition process of the object using the feature image.

According to still another example aspect of the present disclosure, there is provided a recording medium storing a program, the program causing a computer to perform a process including:
selecting a feature image representing a feature portion of an object from among captured images of a time series in which the object is photographed; and
performing a recognition process of the object using the feature image.

Effect of the Invention

According to the present disclosure, it is possible to improve efficiency of recognition at an abnormal portion based on a captured image of an object.

BRIEF DESCRIPTION OF THE DRAWINGS

FIG. 9A and FIG. 9B illustrate functional configurations of an image selector according to a second example embodiment.

EXAMPLE EMBODIMENTS

In the following, example embodiments will be described with reference to the accompanying drawings.

[Basic Principle]

Figure 1:
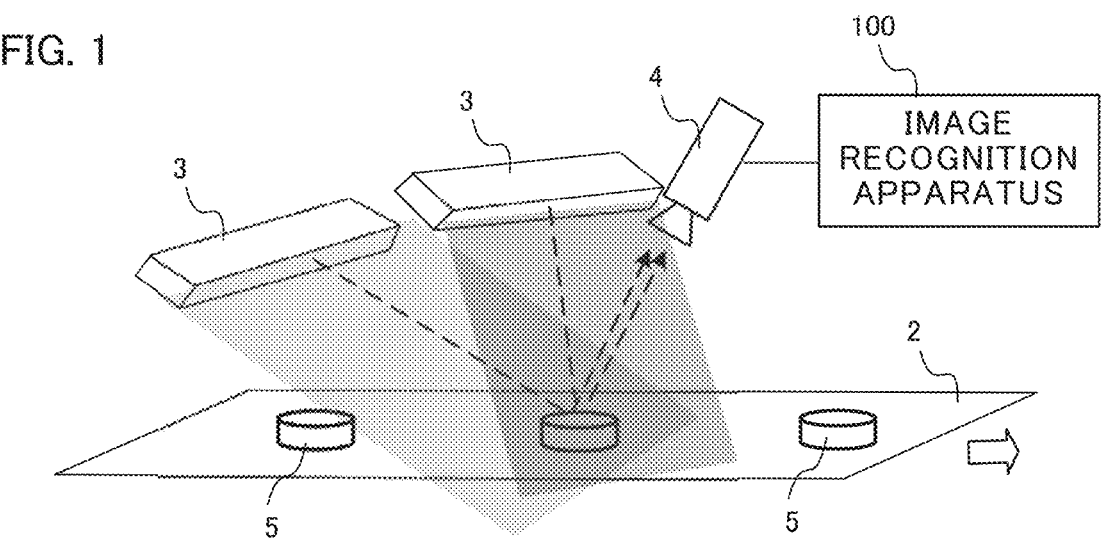
FIG. 1 illustrates a state of an abnormality detection using an image recognition apparatus.

First, a basic principle of an image recognition apparatus 100 will be described according to the present disclosure. FIG. 1 illustrates a state of an abnormality detection using the image recognition apparatus 100. In the present example embodiment, an object for abnormality detection is a tablet 5. The tablet 5 is disposed at predetermined intervals on a conveyor 2 moving in a direction of an arrow, and moves with a movement of the conveyor 2. Illuminations 3 and a high-speed camera 4 are disposed above the conveyor 2. In an example of FIG. 1, two bar-type illuminations 3 are used, but a form of each illumination is not limited thereto. Depending on a shape of the object and a type of the abnormality to be detected, a plurality of illuminations having various intensities and various illumination ranges are installed. Especially in a case of a small object such as the tablet 5, a type, a degree, a position, and the like of a small abnormality are varied, and therefore, photographing is carried out by variously changing a lighting condition using a plurality of illuminations.

The high-speed camera 4 takes a high-speed photograph of the tablet 5 under illumination, and outputs captured images to the image recognition apparatus 100. In a case of photographing the tablet 5 with high-speed by the high-speed camera 4 while conveying the tablet 5, it is possible to photograph the tablet 5 without missing a timing when a S/N (Signal to Noise Ratio) of a small abnormal portion present on the tablet 5 becomes high. Specifically, abnormalities occurring on the tablet 5 include hair adhesion, fine chipping, and the like. Since a hair can be detected based on a specular reflection component of illumination light due to a gloss of a surface of the hair, it is effective to use illumination light along an optical axis of the high-speed camera 4. On the other hand, since the small chipping of the tablet 5 can be detected based on light and darkness around an edge of the portion, it is effective to use illumination light from a direction perpendicular to the optical axis of the high-speed camera 4.

As described above, in a case where the tablet 5 being an object is photographed by the high-speed camera 4, an enormous time series of captured images (hereinafter, also referred to as "time series images") can be obtained, but after that, a process time for detecting a small abnormality also increases, and the real-time process of the abnormality detection becomes difficult. Among the enormous time series images obtained by the high-speed camera 4, because it has been found that the small anomaly appears as a temporarily steep change in statistical quantities of images at a timing when an illumination condition is fitted, images at a timing without a tendency of the temporarily steep change are redundant, and are thus considered unnecessary. Therefore, in the present example embodiment, an image including a small abnormality, that is, an image having a temporarily steep change in statistical quantities of images is selected from among the time series images obtained by the high-speed camera 4, and an image selection for discarding redundant images is carried out.

Figure 2:
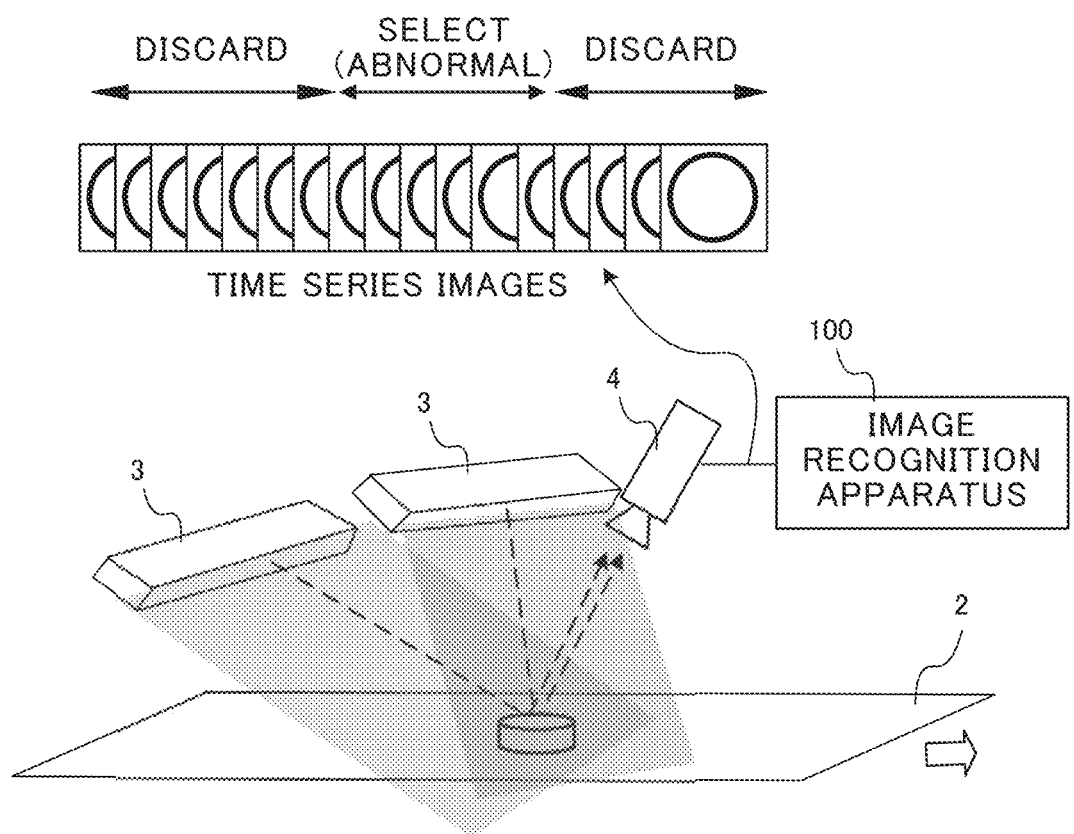
FIG. 2 is a diagram for explaining a concept of an image selection from among a time series images.

FIG. 2 is a diagram illustrating a concept of the image selection among time series images. The time series images are obtained by photographing tablets 5 on the moving conveyor 2 with the high-speed camera 4. The image recognition apparatus 100 selects an image including a small abnormality among the time series images, and performs recognition with respect to the selected image to detect the abnormality. Unselected images are discarded and then excluded from subjects of recognition process carried out in a subsequent stage. Accordingly, a load of the recognition process can be reduced, and it is possible to increase speed of the overall processing.

Note that in a case where an object is a plate-shaped object such as the tablet as described above, if the conveyor 2 is provided with a mechanism for reversing the object by vibration or the like, captured images before and after reversing the object can be captured by one camera and an inspection can be carried out for both sides of the object. Similarly, even in a case where the object is three-dimensional, if the conveyor 2 is provided with a mechanism for rotating the object, it is possible to determine an abnormality by photographing a plurality of surfaces of the object.

First Example Embodiment (Hardware Configuration)

Figure 3:
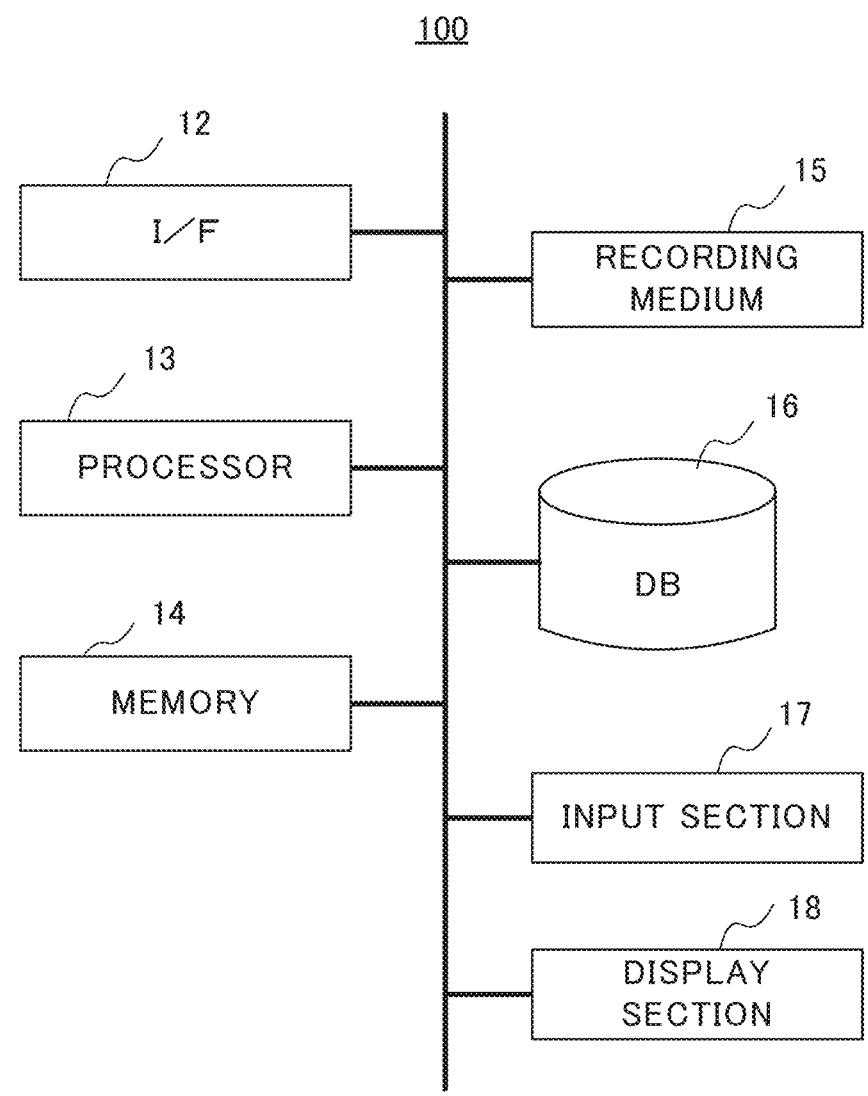
FIG. 3 is a diagram illustrating a hardware configuration of an image recognition apparatus according to a first example embodiment.

FIG. 3 is a block diagram illustrating a hardware configuration of the image recognition apparatus according to a first example embodiment. As illustrated, the image recognition apparatus 100 includes an interface (I/F) 12, a processor 13, a memory 14, a recording medium 15, a database (DB) 16, an input section 17, and a display section 18.

The interface 12 performs an input and output of data to and from external apparatus. Specifically, the time series images to be processed by the image recognition apparatus 100 are input through the interface 12. Furthermore, a detection result of an abnormality or the like generated by the image recognition apparatus 100 is output to the external apparatus through the interface 12.

The processor 13 is a computer such as a CPU (Central Processing Unit) or a GPU (Graphics Processing Unit) with the CPU, and controls the entire image recognition apparatus 100 by executing programs prepared in advance. Specifically, the processor 13 executes an image recognition process described later.

The memory 14 is formed by a ROM (Read Only Memory), a RAM (Random Access Memory), or the like. The memory 14 is also used as a working memory during executions of various processes by the processor 13.

The recording medium 15 is a non-volatile and non-transitory recording medium such as a disk-shaped recording medium or a semiconductor memory, and is formed to be detachable from the image recognition apparatus 100. The recording medium 15 records various programs executed by the processor 13. When the image recognition apparatus 100 executes various kinds of processes, a program recorded on the recording medium 15 is loaded into the memory 14 and executed by the processor 13.

The database 16 stores a captured image to be an object of image recognition. The input section 17 includes a keyboard, a mouse, or the like for a user to perform instructions and input. The display section 18 is formed by, for instance, a liquid crystal display, and displays a recognition result of the object or the like.

(Functional Configuration)

Figure 4:
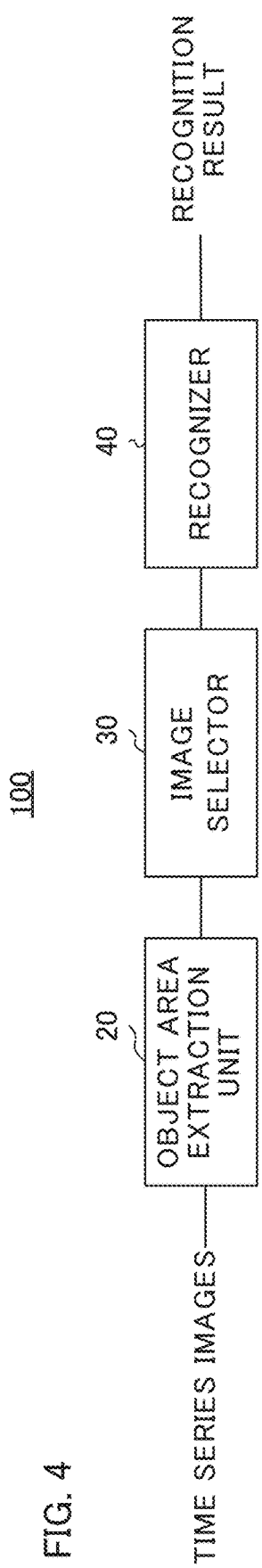
FIG. 4 is a diagram illustrating a functional configuration of an image recognition apparatus according to the first example embodiment.

FIG. 4 is a block diagram illustrating a functional configuration of the image recognition apparatus 100 according to the first example embodiment. The image recognition apparatus 100 includes an object area extraction unit 20, an image selector 30, and a recognizer 40. The object area extraction unit 20 receives the time-series images of the object from the high-speed camera 4 and extracts an object area that is an area including the object from each captured image. Specifically, the object area extraction unit 20 extracts an object area of an object in each captured image by a background subtraction method or the like. In this example embodiment, since the object is the tablet 5, the object area is regarded as an area of the tablet 5 in the captured image, and specifically is a rectangular area including the tablet 5 as illustrated in FIG. 2. The object area extraction unit 20 outputs time series images of the extracted object area to the image selector 30.

The image selector 30 selects an image (hereinafter, referred to as a "feature image") representing a portion of a small and infrequent abnormal feature of the object (hereinafter, referred to as a "small and infrequent feature") from time series images of the input object area. In this example embodiment, a hair, a chipping, and the like present on the tablet 5, which is an object, correspond to abnormalities of the object. The image selector 30 selects a feature image including a small and infrequent feature from the input time series images, outputs the selected feature image to the recognizer 40, and discards images other than the feature image, that is, the image which does not include the small and infrequent feature. As described above, since the small and infrequent feature of the object appears as a temporarily steep change in a statistical quantity of the image in a captured image, the image selector 30 selects, as the feature image, a series of captured images from among input time series images in which the statistical quantity of the image indicates the temporarily steep change.

Figure 5:
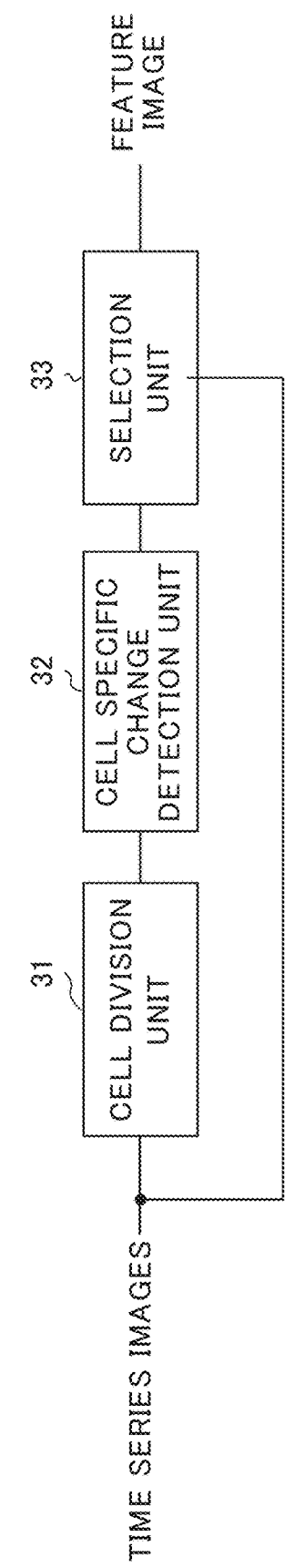
FIG. 5 is a diagram illustrating a configuration of an image selector.
Figure 6:
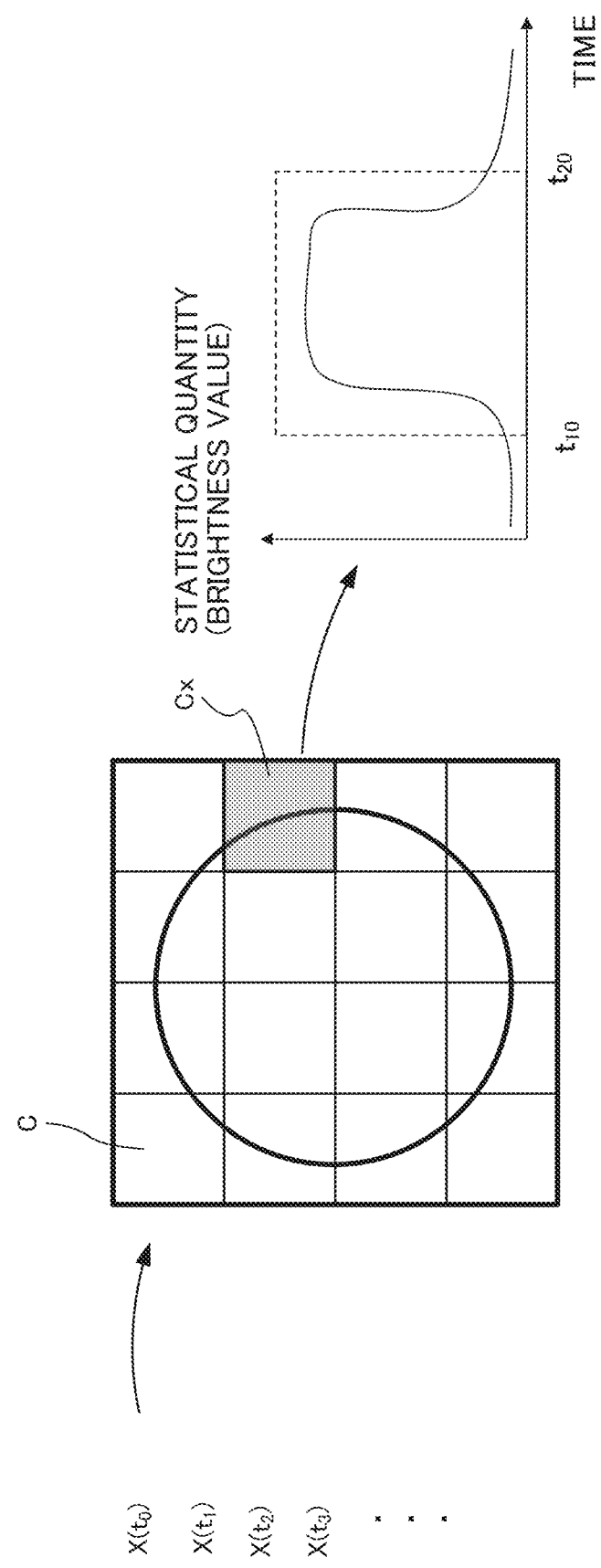
FIG. 6 illustrates an example of a process by the image selector.

FIG. 5 is a block diagram illustrating a configuration of the image selector 30. The image selector 30 includes a cell division unit 31, a cell specific change detection unit 32, and a selection unit 33. FIG. 6 illustrates an example of a process by the image selector 30. The time series images output from the object area extraction unit 20 are input to the cell division unit 31 and the selection unit 33. The cell division unit 31 divides each captured image into a plurality of cells C. In an example of FIG. 6, the cell division unit 31 divides each captured image into 16 cells C of a predetermined size (4×4). An image of a divisional cell C is input to the cell specific change detection unit 32.

The cell specific change detection unit 32 calculates a statistical quantity of an image for each cell. In the example of FIG. 6, the cell specific change detection unit 32 uses a brightness value as the statistical quantity of the image. The cell specific change detection unit 32 calculates a change per time of the statistical quantity calculated for each cell. Specifically, the cell specific change detection unit 32 obtains a statistical quantity at each time for each cell, and outputs change per time data representing the change per time to the selection unit 33. In FIG. 6, for convenience of an explanation, an example of the change per time of the brightness value of one cell Cx is illustrated in a graph.

The selection unit 33 selects a captured image as the feature image when the statistical quantity is changing by a predetermined amount or more based on the change per time of the statistical quantity for each cell. In the example of FIG. 6, as illustrated by a dashed line area, the selection unit 33 detects a captured image $X(t_{10})$ at a time $t_{10}$ when the statistical quantity begins changing and a captured image $X(t_{20})$ at the time $t_{20}$ when the change ends, and selects a series of captured images $X(t_{10})$ through $X(t_{20})$ including the captured image $X(t_{10})$ and the captured image $X(t_{20})$ as the feature images. More specifically, the selection unit 33 specifies the captured images $X(t_{10})$ through $X(t_{20})$ based on the change per time data input from the cell specific change detection unit 32, selects the captured images $X(t_{10})$ through $X(t_{20})$ from the time-series images input from the object area extraction unit 20, and outputs the selected images $X(t_{10})$ through $X(t_{20})$ as feature images to the recognizer 40. By detecting the change of the statistical quantity of the image in this manner, it is possible to select only a series of captured images showing abnormalities of the object among the captured images in the time series.

Note that in the example of FIG. 6, in a case where the change in the statistical quantity occurs only in one of the plurality of cells C obtained by dividing a captured image and there are abnormalities at a plurality of locations of one object, the change in the statistical quantity occurs at the same time with respect to the plurality of cells C. Accordingly, in a case where the change in the statistical quantity occurs in one of the plurality of cells C, the selection unit 33 selects a series of captured images including the captured image regarded as the feature image. In other words, the selection unit 33 discards only the captured image in which no change in the statistical quantity has occurred in any of the cells C.

The recognizer 40 performs an image recognition process using the feature image selected by the image selector 30, and outputs the recognition result. Specifically, the recognizer 40 is formed by a neural network or the like, and performs class classification or abnormality detection of an object using a previously trained recognition model, and outputs a result as a recognition result.

(Image Recognition Process)

Figure 7:
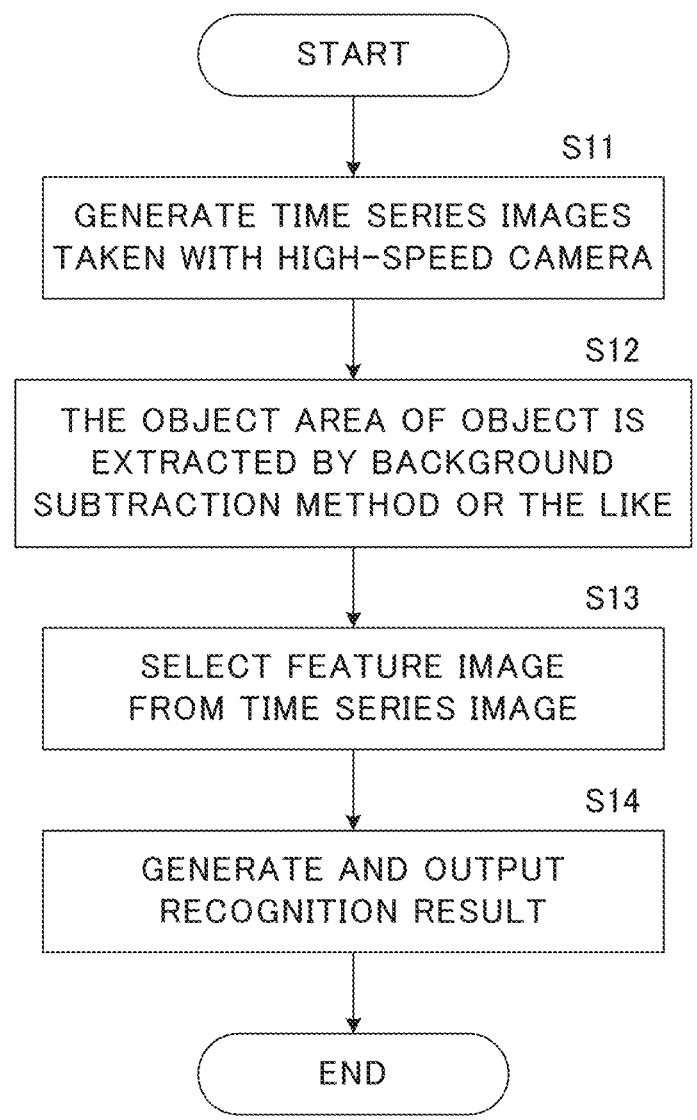
FIG. 7 is a flowchart of an image recognition process according to the present example embodiment.

FIG. 7 is a flowchart of the image recognition process according to the present example embodiment. This process is realized by the processor 13 illustrated in FIG. 3, which executes a program prepared in advance and operates as each element depicted in FIG. 4 and FIG. 5.

First, as illustrated in FIG. 1, the object being moved is captured by the high-speed camera 4, the time series images are generated (step S11). Next, the object area extraction unit 20 extracts the object area of the object from each captured image by the background subtraction method or the like (step S12). Subsequently, the image selector 30 selects the feature image showing a small and infrequent feature from the time series images of the object area by the method described above (step S13). The recognizer 40 performs the class classification or the abnormality detection of the object using the feature image, and outputs a result as the recognition result (step S14). After that, the image recognition process is terminated.

(Modification)

In the above-described example embodiment, the cell division unit 31 divides the captured image of the object area into the cells C of a predetermined size; however, the method for dividing into cells is not limited thereto. For instance, a super pixel cell, which is created by grouping pixels based on a gradation value or a color feature in each captured image, may be used as the cell C. Moreover, in another example, each pixel of the captured image may be used as the cell C.

Figure 8A:
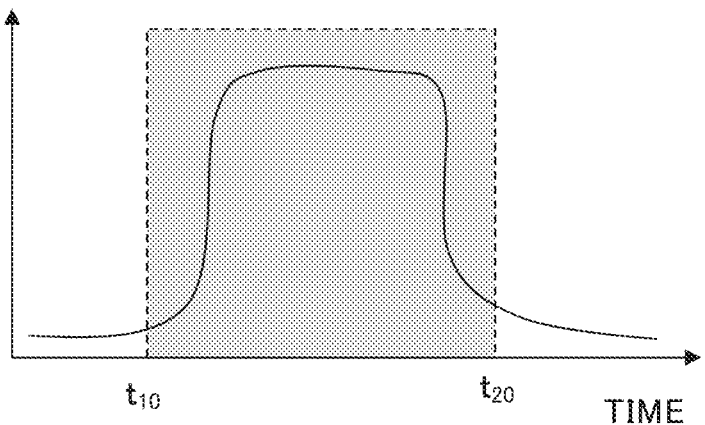
FIG. 8A and FIG. 8B illustrate examples of changing a range of the image selector.
Figure 8B:
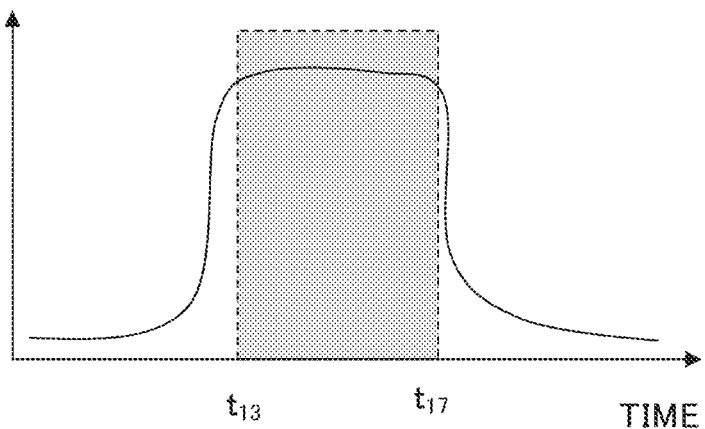

In the above-described example embodiment, as illustrated in a graph (the same as the graph in FIG. 6) in FIG. 8A, the image selector 30 selects, as the feature images, a series of captured images including images from the time $t_{10}$ when the change in the statistical quantity of an image has begun to the time $t_{20}$ when the change has ended. However, the image selector 30 does not fix an amount of the series of captured images to be selected as the feature images, and may change the amount according to a processing load of the recognizer 40 in a subsequent stage. For instance, in a case where the processing load of the recognizer 40 is light, that is, there is a margin in the processing of the recognizer 40, the image selector 30 selects a series of captured images including images of a start time and an end time of the change in the statistical quantity of the images as the feature images as illustrated in FIG. 8A. On the other hand, in a case where the processing load of the recognizer 40 is heavy, that is, there is no margin in the processing of the recognizer 40, the image selector 30 may reduce a range of a captured image to be selected as illustrated in FIG. 8B. In an example of FIG. 8B, for instance, the image selector 30 selects a series of captured images as the feature images from a time $t_{13}$ at which an increase of the statistical quantity is completed to a time $t_{17}$ at which a decrease of the statistical quantity is started. Accordingly, by adjusting the amount of the feature images to be selected according to the processing load of the recognizer 40, it is possible to stably perform the recognition process at a real time.

Second Example Embodiment (Functional Configuration)

Next, a second example embodiment will be described. In the second example embodiment, the image selector 30 is formed by a neural network to which a deep learning model is applied. A hardware configuration of the image recognition apparatus 100 according to the second example embodiment is the same as that illustrated in FIG. 1, and a functional configuration is the same as that illustrated in FIG. 4.

FIG. 9A illustrates a configuration at a time of learning of the image selector 30 according to the second example embodiment. The image selector 30 includes a neural network 35 and an optimization unit 37 at the time of learning, and performs supervised learning of the deep learning model applied to the neural network 35. The time series images of an object area, which is extracted by the object area extraction unit 20, are input to the neural network 35 as training data. The deep learning mode that selects a feature image from time series images is applied to the neural network 35. The neural network 35 selects a non-redundant captured image as the feature image from the input time series images, and outputs an image index (that is, an image ID or a photographing time of the image) indicating the captured image to the optimization unit 37. Here, a non-redundant captured image refers to an image in which a difference in a feature amount between photographed images adjacent in time is large, and corresponds to a feature image representing a small and infrequent feature of an object.

At the time of learning, a correct answer label giving a correct answer to the time series image input to the neural network 35 are prepared and input to the optimization unit 37. Each of the correct answer label indicates whether or not a time series image is a non-redundant image. The optimization unit 37 calculates a loss between the image index output from the neural network 35 and the correct answer label, and optimizes parameters of the neural network 35 so that the loss is reduced.

FIG. 9B illustrates a configuration at the time of inference of the image selector 30 according to the second example embodiment. At the time of inference, the image selector 30 includes the neural network 35 to which the deep learning model trained by the above method is applied, and a selection unit 36. Time series images output from the object area extraction unit 20 are input to the neural network 35 and the selection unit 36. The neural network 35 detects a non-redundant captured image from the time series images using the trained deep learning model, and outputs the image index to the selection unit 36. The selection unit 36 selects only the captured image corresponding to the image index output by the neural network 35 among the time series images input from the object area extraction unit 20, and outputs the selected image to the recognizer 40 as the feature image. Accordingly, using the trained deep learning model, the non-redundant captured image is selected from among the time series images, and is output to the recognizer 40 as the feature image. Since the recognizer 40 performs the image recognition only for the selected feature image, it is possible to speed up the recognition process.

In the above example, the correct answer label is given per unit of the captured image as training data at the time of learning of the deep learning model; however, instead, the captured image may be divided into a plurality of cells as described in the first example embodiment, and the correct answer label may be given per unit of a cell. In this case, the neural network 35 first divides the input captured image into a plurality of cells, acquires a non-redundancy for each cell, and outputs each cell to the optimization unit 37. The optimization unit 37 may optimize the neural network 35 in order to obtain a loss between the non-redundancy acquired for each cell and a correct answer label prepared for each cell. Also in this case, similarly to the first example embodiment, cells having a predetermined size, super pixels, or the like may be used.

(Example of the Image Selection Unit)

Figure 10A:
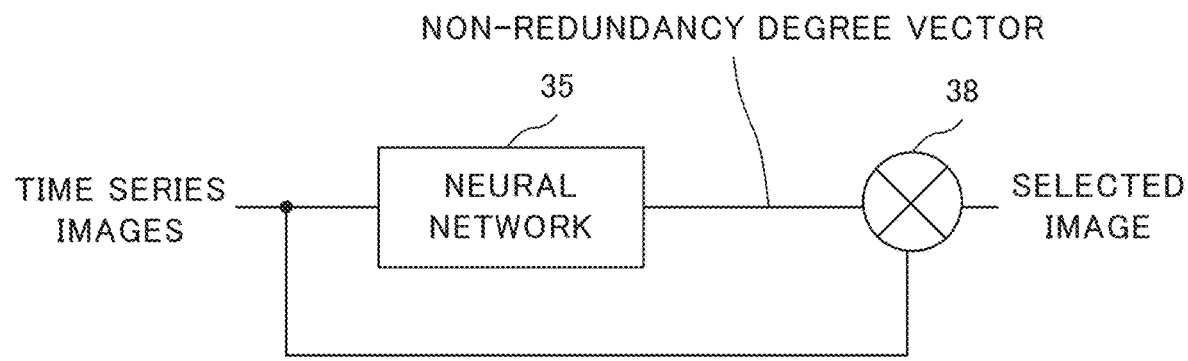
FIG. 10A and FIG. 10B illustrates examples of the image selector according to the second example embodiment.

FIG. 10A illustrates an example of a case where the image selector 30 is formed using the deep learning model. In this example, the image selector 30 connects the time series images in a time axis direction, calculates an evaluation value for each cell by a convolution operation, and selects the feature image. As illustrated, the image selector 30 includes the neural network 35 to which the deep learning model is applied, and a convolution operation unit 38. The time series images are input to the neural network 35 and the convolution calculation unit 38. The neural network 35 extracts the feature amount from each input time series image, generates a non-redundancy degree vector, and outputs the non-redundancy degree vector to the convolution operation unit 38. The convolution operation unit 38 calculates a product of the time series image and the non-redundancy vector in the time axis direction.

Figure 11:
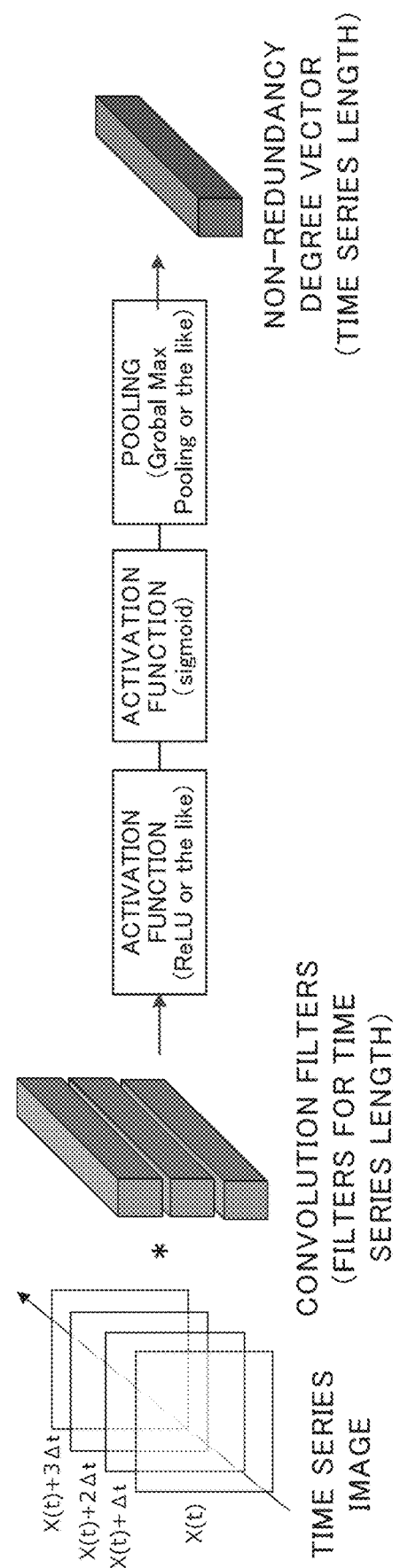
FIG. 11 schematically illustrates a generation method of a non-redundancy degree vector.

FIG. 11 schematically illustrates a method for generating the non-redundant degree vector. The non-redundancy degree vector is regarded as a vector representing a length of input time series images. Note that for instance, this length is a length of the time series images until disappears after one object appears. The neural network 35 applies convolutional filters for the length of the time series to the input time series images, and applies an activation function such as a ReLU(Rectified Linear Unit) to each output. These convolution filter process and activation process may be repeated as long as the computational load remains low. Accordingly, statistical quantities, that is, non-redundancy degrees of the captured images are acquired. Next, the neural network 35 normalizes the acquired statistical quantities in a range of "0" through "1" with the activation function (sigmoid function), and pools the normalized statistical quantities to generate the non-redundant degree vectors for the length of the time series. In each of the non-redundancy degree vectors, each element indicates the non-redundancy degree of the captured image at a corresponding time.

Returning to FIG. 10A, by the convolution operation unit 38 that performs a convolutional operation with respect to each captured image in time series, each time series image is weighted by the non-redundancy degree vector, and is output as the feature image. At the time of learning, the deep learning model is optimized using each weighted time series image and the correct answer label. Although an image selection process is regarded as a non-differentiable process, because the image selection process is made to be a differentiable process by weighting only the non-redundancy degree vector at the time of learning and to be capable of performing learning at the same time together with the recognizer 40 in the subsequent stage, it is possible to perform an end-to-end process.

Figure 10B:
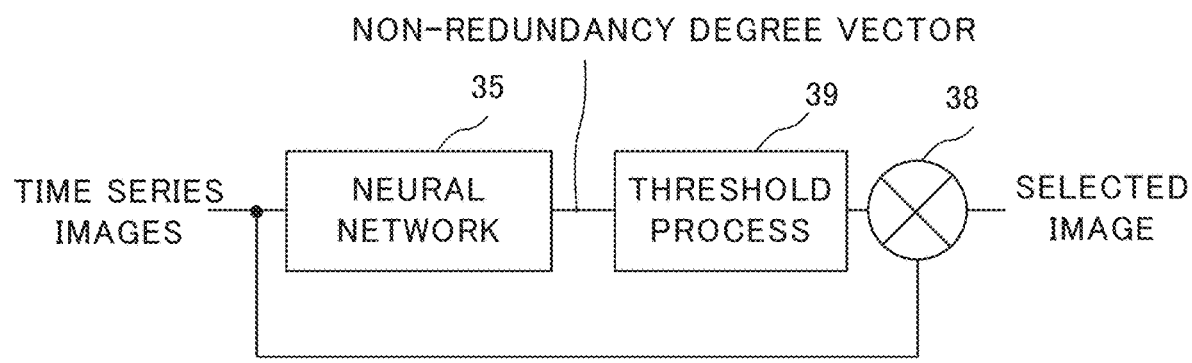

On the other hand, at the time of inference, as illustrated in FIG. 10B, a threshold process by a threshold process unit 39 is applied to the non-redundant degree vector output from the neural network 35. The threshold process unit 39 retains elements which non-redundancy degrees belong to top N degrees, among elements of the non-redundancy degree vector, and values of elements below the top N degrees are set to "0". Here, the "N" is an arbitrary number and indicates a specified value indicating a number of images selected by the image selector 30. The convolution operation unit 38 performs a convolution of the time series images and the non-redundancy degree vector after the threshold process. Accordingly, among the input time series images, the captured images having the non-redundancy degrees belonging to the top N degrees are selected as the feature images. That is, the number of the captured images to be passed to the recognizer 40 of the subsequent stage is reduced to N images. Noted that a value of "N" is adjustable in terms of a trade-off between processing accuracy and processing speed by the recognizer 40 at the subsequent stage.

Note that in a case where the deep learning model is used for the image selector 30, if a model with a large processing load is used, there is no point in reducing the processing load of the recognizer 40 at the subsequent stage by image selection. Accordingly, as the deep learning model, a model with a processing load smaller than the processing load reduced by image selection is used in the recognizer 40. Therefore, it is possible to acquire an effect of the image selection, and to realize stable real-time processing.

In a case where the deep learning model is used for the image selector 30, the end-to-end learning is enabled by forming one neural network together with the recognizer 40 of the subsequent stage. That is, in a case of forming a system, a time and an effort of a repetitive work is reduced for examining a plurality of image selection models according to the data characteristics of an object, separately training the image selection models, or evaluating a combination with a recognizer.

(Example of the Image Recognition Apparatus)

Figure 12A:
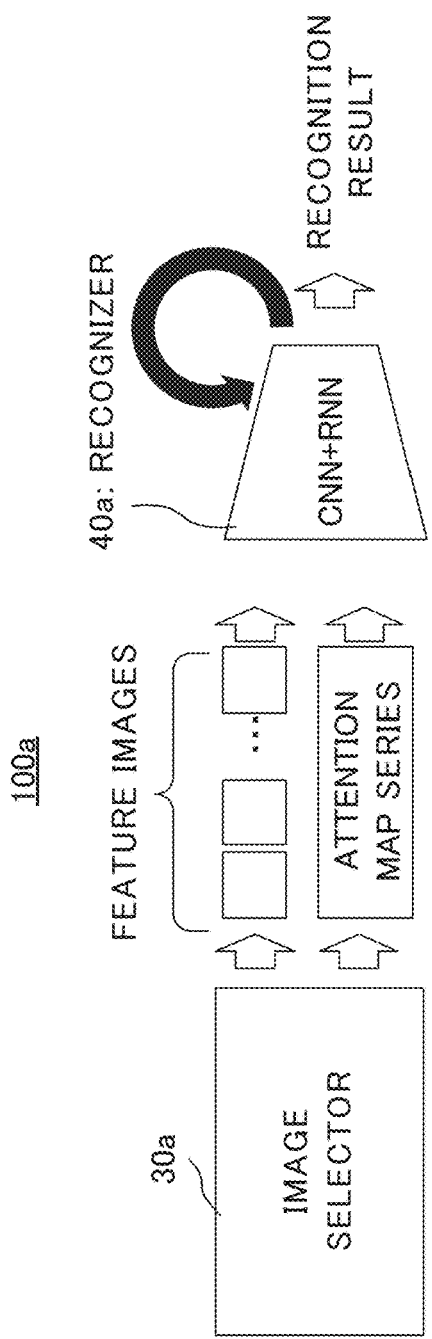
FIG. 12A and FIG. 12B illustrate schematical configurations of an image recognition apparatus using a deep learning model.

Next, an example of the image recognition apparatus will be described in the case where the deep learning model is used. FIG. 12A illustrates a schematic configuration of the image recognition apparatus 100*a* in a case of using the deep learning model. In this example, the recognizer 40*a* is formed by a neural network combining the CNN (Convolutional Neural Network) and the RNN (Recurrent Neural Network). A normal recognizer, which detects an abnormality from one image, requires a large amount of calculation and is unsuitable for high-speed inspection based on time-series images. In this regard, by combining a lightweight CNN and a regression (Recurrent) structure in the recognizer 40 as this example, it is possible to recognize time series images at high speed.

Furthermore, in the present example, an attention (Attention) map series is generated by an image selector 30*a*, and is input to the recognizer 40*a* at a subsequent stage. An attention map indicates an attention of the cell that served as the basis for determination of the image selection in the image selector 30*a*. The image selector 30*a* generates the attention map by obtaining a small and infrequent feature for each cell in the time axis direction using the time series images. By inputting an attention map series to the recognizer 40*a*, it is expected to improve discrimination accuracy of the small and infrequent feature in the recognizer 40*a*.

Figure 12B:
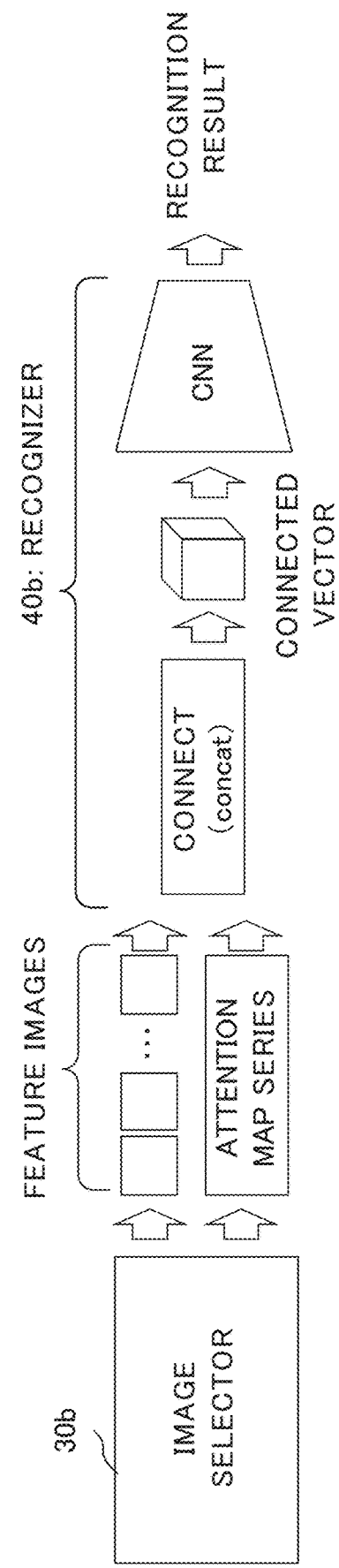

FIG. 12B illustrates a schematic configuration of another image recognition apparatus 100*b* in the case of using the deep learning model. Even in this example, the image selector 30*b* inputs the attention map series to the recognizer 40*b* in addition to the feature image. The recognizer 40*b* generates a vector in which the attention map series is connected (concat) in the time axis direction, and performs recognition by the CNN using the generated vector and the feature image.

Third Example Embodiment

Figure 13:
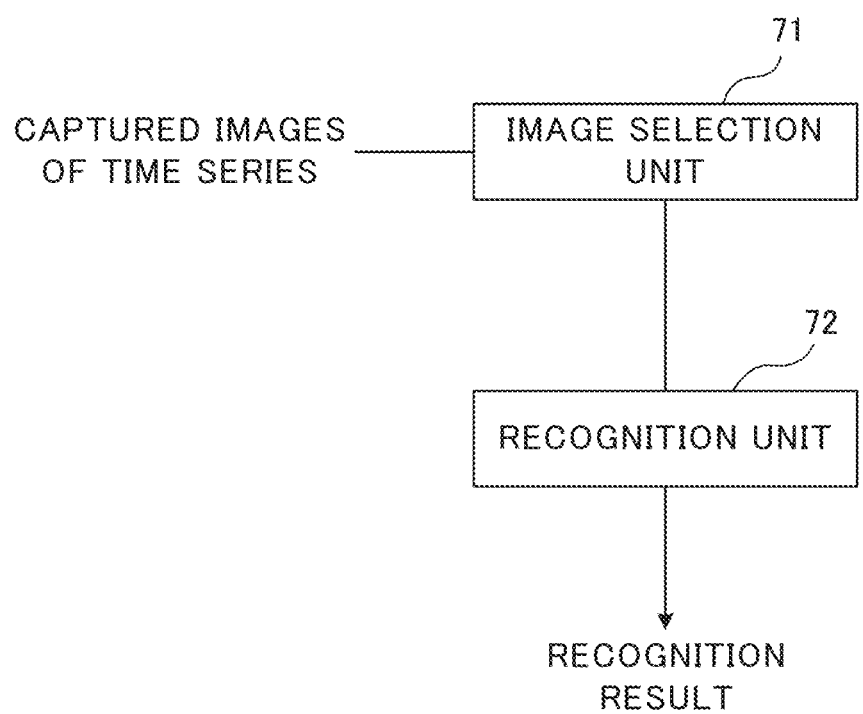
FIG. 13 illustrates a functional configuration of the image recognition apparatus according to the third example embodiment.

Next, a third example embodiment of the present disclosure will be described. FIG. 13 illustrates a functional configuration of an image recognition apparatus according to the third example embodiment. An image recognition apparatus 70 includes an image selection unit 71, and a recognition unit 72. The image selection unit 71 selects a feature image indicating a feature portion of an object from among captured images of a time series in which an object is photographed. The recognition unit 72 performs a recognition process with respect to the object using the feature image.

A part or all of the example embodiments described above may also be described as the following supplementary notes, but not limited thereto.

(Supplementary Note 1)

1. An image recognition apparatus comprising:

an image selection unit configured to select a feature image representing a feature portion of an object from among captured images of a time series in which the object is photographed; and a recognition unit configured to perform a recognition process of the object using the feature image.

(Supplementary Note 2)

2. The image recognition apparatus according to supplementary note 1, wherein the image selection unit divides each of the captured images into a plurality of cells, and selects the feature image from among the captured images of the time series based on a change of a statistical quantity for each of the plurality of cells.

(Supplementary Note 3)

3. The image recognition apparatus according to supplementary note 2, wherein the image selection unit selects successively captured images as feature images from a captured image at which the change of the statistical quantity for each of the plurality of cells has begun to a captured image in which the change has ends.

(Supplementary Note 4)

4. The image recognition apparatus according to supplementary note 2 or 3, wherein the cells are either of cells of a predetermined size in which the captured image is divided, super pixel cells, and pixel cells forming the captured image.

(Supplementary Note 5)

5. The image recognition apparatus according to supplementary note 1, wherein the image selection unit is formed by a neural network, and selects the feature image using a trained model so as to select the feature image from among the captured images of the time series.

(Supplementary Note 6)

6. The image recognition apparatus according to supplementary note 5, wherein the image selection unit extracts feature amounts from the captured images of the time series, generates a vector representing non-redundancy degrees among the captured images of the time series based on the feature amounts, and selects the feature image from among the captured images of the time series using the vector.

(Supplementary Note 7)

7. The image recognition apparatus according to supplementary note 6, wherein the image selection unit divides each of the captured images into a plurality of cells, and selects the feature image from among the captured images of the time series based on the non-redundancy degrees of respective cells for each of the captured images.

(Supplementary Note 8)

8. The image recognition apparatus according to supplementary note 7, wherein the image selection unit outputs attention information of a cell that is a basis for selecting the feature image, to the recognition unit; and the recognition unit recognizes the feature portion of the object using the attention information.

(Supplementary Note 9)

9. The image recognition apparatus to any one of supplementary notes 5 through 8, wherein the image selection unit and the recognition unit are formed by a single neural network.

(Supplementary Note 10)

10. The image recognition apparatus to any one of supplementary notes 1 through 9, wherein the feature portion is a portion that indicates an abnormality existing on the object; and the recognition unit performs a class classification concerning the abnormality of the object, or a detection of the abnormality existing on the object.

(Supplementary Note 11)

11. An image recognition method comprising:

selecting a feature image representing a feature portion of an object from among captured images of a time series in which the object is photographed; and performing a recognition process of the object using the feature image.

(Supplementary Note 12)

12. A recording medium storing a program, the program causing a computer to perform a process comprising:

selecting a feature image representing a feature portion of an object from among captured images of a time series in which the object is photographed; and performing a recognition process of the object using the feature image.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

4 High-speed camera
5 Tablet
20 Object area extraction unit
30 Image selector
31 Cell division unit
32 Cell specific change detection unit
33 Selection unit
35 Neural network
37 Optimization unit
38 Convolution operation unit
39 Threshold process unit
40 Recognition unit
100 Image recognition apparatus

What is claimed is:

1. An image recognition apparatus comprising:
a memory storing instructions; and
one or more processors configured to execute the instructions to:
divide each of a plurality of captured images which capture an object in time series into a plurality of cells;
select a feature image representing a feature portion of the object based on a change per time of a brightness value for each cell in the time series, from among the plurality of captured images that captured the object in the time series; and
perform a recognition process of the object using the feature image,
wherein the feature image that is selected is an image in which a brightness value temporarily changes steeply at a timing when an illumination condition is satisfied and which indicates a small abnormality.

2. The image recognition apparatus according to claim 1, wherein the one or more processors select successively captured images as feature images from a captured image at which the change of the statistical quantity for each of the plurality of cells has begun to a captured image in which the change has ends.

3. The image recognition apparatus according to claim 1, wherein the cells are either cells of a predetermined size in which the plurality of captured images is divided, super pixel cells, and pixels forming the plurality of captured images.

4. The image recognition apparatus according to claim 1, wherein the one or more processors use a neural network, and select the feature image using a trained model so as to select the feature image from among the plurality of captured images that captured the object in the time series.

5. The image recognition apparatus according to claim 4, wherein the one or more processors extract feature amounts from the plurality of captured images that captured the object in the time series, generate a vector representing non-redundancy degrees among the plurality of captured images that captured the object in the time series based on the feature amounts, and select the feature image from among the plurality of captured images that captured the object in the time series using the vector.

6. The image recognition apparatus according to claim 5, wherein the one or more processors divide each of the plurality of captured images into a plurality of cells, and select the feature image from among the plurality of captured images that captured the object in the time series based on the non-redundancy degrees of respective cells for each of the plurality of captured images.

7. The image recognition apparatus according to claim 6, wherein
the one or more processors output attention information of a cell that is a basis for selecting the feature image; and
the one or more processors recognize the feature portion of the object using the attention information.

8. The image recognition apparatus to claim 4, wherein the one or more processors perform an image selection process and the recognition process which are formed by a single neural network.

9. The image recognition apparatus to claim 1, wherein
the feature portion is a portion that indicates an abnormality existing on the object; and
the one or more processors perform a class classification concerning the abnormality of the object, or a detection of the abnormality existing on the object.

10. An image recognition method performed by a computer and comprising:
dividing each of a plurality of captured images which capture an object in time series into a plurality of cells;
selecting a feature image representing a feature portion of the object based on a change per time of a brightness value for each cell in the time series, from among the plurality of captured images that captured the object in the time series; and
performing a recognition process of the object using the feature image,
wherein the feature image that is selected is an image in which a brightness value temporarily changes steeply at a timing when an illumination condition is satisfied and which indicates a small abnormality.

11. A non-transitory computer-readable recording medium storing a program executable by a computer to perform a process comprising:
dividing each of a plurality of captured images which capture an object in time series into a plurality of cells;
selecting a feature image representing a feature portion of the object based on a change per time of a brightness value for each cell in the time series, from among the plurality of captured images that captured the object in the time series; and
performing a recognition process of the object using the feature image,
wherein the feature image that is selected is an image in which a brightness value temporarily changes steeply at a timing when an illumination condition is satisfied and which indicates a small abnormality.

* * * * *